(12) United States Patent
Boling et al.

(10) Patent No.: US 6,226,510 B1
(45) Date of Patent: May 1, 2001

(54) EMERGENCY PHONE FOR AUTOMATICALLY SUMMONING MULTIPLE EMERGENCY RESPONSE SERVICES

(75) Inventors: Brian M. Boling; Michael C. Bernstein; Nicolas A. Natale, all of Knoxville, TN (US)

(73) Assignee: American Secure Care, LLC, Knoxville, TN (US)

( * ) Notice: Subject to any disclaimer, the term of this patent is extended or adjusted under 35 U.S.C. 154(b) by 0 days.

(21) Appl. No.: 09/173,645

(22) Filed: Oct. 16, 1998

Related U.S. Application Data (63) Continuation-in-part of application No. 09/044,497, filed on Mar. 19, 1998, now Pat. No. 6,044,257.

(51) Int. Cl.$^7$ ................................................ H04B 7/00
(52) U.S. Cl. ..................... 455/404; 455/521; 340/574
(58) Field of Search ................................ 455/404, 564, 455/566, 575, 414, 521; 340/574, 507, 990

(56) References Cited

U.S. PATENT DOCUMENTS

| | | | |
|---|---|---|---|
| 5,542,100 | * | 7/1996 | Hatakeyama .................. 455/56.1 |
| 5,740,532 | * | 4/1998 | Fernandez ...................... 455/404 |
| 5,742,666 | * | 4/1998 | Alpert ............................ 379/58 |
| 5,742,904 | * | 4/1998 | Pinder ............................ 404/404 |
| 5,745,849 | * | 4/1998 | Britton .......................... 455/404 |
| 6,014,555 | * | 1/2000 | Tendler ......................... 455/404 |
| 6,047,196 | * | 4/2000 | Makela ......................... 455/556 |

* cited by examiner

*Primary Examiner*—Thanh Cong Le
*Assistant Examiner*—Nick Corsaro
(74) *Attorney, Agent, or Firm*—Luedeka, Neely & Graham, P.C.

(57) ABSTRACT

A hand-held wireless communication apparatus transmits and receives cellular radio signals that are compatible with a cellular network, and summons assistance during an emergency situation from multiple emergency response services. The apparatus comprises a lightweight and rigid housing with a cellular transmitter disposed therein. When activated, the cellular transmitter generates first outgoing cellular radio signals, such as paging messages, that contain information for a private emergency response service, and second outgoing cellular radio signals to communicate with a public emergency response service. The apparatus includes an emergency response button which is the sole means of activating the transmitter. When pressed, the emergency response button alone activates the transmitter to cause the transmitter to generate the first and second outgoing cellular radio signals. The apparatus also includes receiver means for receiving incoming cellular radio signals over the cellular network from at least one of the emergency response services, and for converting the incoming cellular radio signals into audio signals. An audio output device receives the audio signals from the receiver means and generates audible messages based on the audio signals. An audible alarm audibly alerts, and a visual alarm visually alerts individuals in the area surrounding the apparatus that an emergency situation exists.

23 Claims, 5 Drawing Sheets

EMERGENCY PHONE FOR AUTOMATICALLY SUMMONING MULTIPLE EMERGENCY RESPONSE SERVICES

This is a continuation-in-part of patent application Ser. No. 09/044,497 filed Mar. 19, 1998, and entitled PANIC BUTTON PHONE, which issued as U.S. Pat. No. Pat. 6,044,257.

FIELD OF THE INVENTION

In general, the present invention relates to personal wireless communication devices. More particularly, the present invention relates to a hand-held cellular communication device that summons help from multiple emergency response services with the push of a single button.

BACKGROUND OF THE INVENTION

Emergency response numbers such as 911 are utilized to provide individuals with a quick and easy way to contact an emergency response service when an emergency situation arises. By providing a standardized method of contacting emergency personnel, these emergency response numbers are effective in reducing the amount of time necessary to respond to an emergency. In an emergency, the amount of time required to respond can often mean the difference between life and death. Response time may be further minimized by employing caller identification technology that allows an operator with the emergency response service to automatically determine the phone number of the caller without requiring the caller to provide such information. If the call was placed from a stationary telephone, the operator with the emergency response service can also determine the location of the caller. Thus, even if the user is unable to verbally request assistance, the emergency response service can still send emergency response personnel to the location from which the call was placed.

One of the primary shortcomings of the prior art devices for utilizing the 911 emergency response system is that a phone terminal is needed to contact the emergency response service. If the emergency situation occurs in a remote area, it is often impossible to place a call to the emergency response service. However, with the advent of cellular telephone technology it is now possible to carry a cellular telephone that allows an emergency caller to contact an emergency response service from practically anywhere. The primary drawbacks of the cellular system are the high cost of cellular service and the inability of the emergency response service to automatically determine the location of the caller.

Cellular devices and services have been offered that are limited to emergency use only. These devices have several buttons that allow a variety of emergency services, such as fire, medical and police, to be summoned. However, the multiple buttons and functions may cause confusion in an emergency situation. Because of the stress often associated with emergency situations, an operator of such a complex emergency communication device may fail to properly summon emergency personnel. In addition, these emergency communication devices fail to integrate the functioning of the cellular device with home alarm systems that the user of the device might have. Furthermore, the devices do not have the capability to summon individuals in the immediate area around the device that may be able to provide assistance.

In addition to contacting emergency response services, victims in emergency situations may wish to summon other persons for help, such as a family member, friend, or neighbor. If the victim were to try to contact these persons using a typical cellular phone, the victim would have to make several separate and sequential calls. The nature of the emergency situation may make it impossible for the victim to dial several phone numbers to contact several different individuals.

SUMMARY OF THE INVENTION

The present invention eliminates the oversights, difficulties, and disadvantages of the prior art by providing a hand-held wireless communication apparatus for transmitting and receiving cellular radio signals that are compatible with a cellular network, and for summoning assistance in an emergency situation. The apparatus comprises a lightweight and rigid housing with a cellular transmitter disposed within the housing. When activated, the cellular transmitter generates first outgoing cellular radio signals that contain information for a private emergency response service, and second outgoing cellular radio signals to communicate with a public emergency response service. The apparatus includes an emergency response button which is the sole means of activating the transmitter. When pressed, the emergency response button alone activates the transmitter to cause the transmitter to generate the first and second outgoing cellular radio signals. The apparatus also includes receiver means disposed within the housing for receiving incoming cellular radio signals over the cellular network from at least one of the emergency response services, and for converting the incoming cellular radio signals into audio signals. An audio output device receives the audio signals from the receiver means and generates audible messages based on the audio signals. The apparatus includes an electrical power source disposed within the housing for supplying electrical power to the apparatus.

Preferred embodiments of the apparatus include an audible alarm for audibly alerting, and a visual alarm for visually alerting individuals in the area surrounding the apparatus that an emergency situation exists.

In another aspect, the invention provides a security system for summoning assistance in an emergency situation. The security system includes a home security system for producing alarms in response to a variety of emergency situations, and that is capable of activation by wireless communications. The security system also includes a hand-held personal security device having a radio frequency transmitter for establishing wireless communications with the home security system if the hand-held personal security device is within communications range of the home security system when the radio frequency transmitter is activated. The device includes a home security alarm button that activates the radio frequency transmitter and causes the hand-held personal security device to establish radio communications with the home security alarm system. The device also includes a cellular transmitter that, when activated, generates first outgoing cellular radio signals that contain information for a private emergency response service. When activated, the cellular transmitter also generates second outgoing cellular radio signals to communicate with a public emergency response service. The device has an emergency response button which is the sole means of activating the transmitter. When pressed, the emergency response button alone activates the cellular transmitter to cause the cellular transmitter to generate the first and second outgoing cellular radio signals. The device further includes receiver means for receiving incoming cellular radio signals over the cellular network from at least one of the emergency response services, and for converting the incoming cellular radio signals into audio signals. An audio output device receives the audio signals from the receiver means and for generates audible messages based on the audio signals. The device has an electrical power source for supplying electrical power to the device.

BRIEF DESCRIPTION OF THE DRAWINGS

Other objects, features and advantages of the present invention will become apparent by reference to the following detailed description when considered in conjunction with the accompanying drawings, in which like reference characters refer to like parts throughout the views, and wherein.

DETAILED DESCRIPTION OF THE PREFERRED EMBODIMENTS

Shown in FIGS. 1–4 is a hand-held wireless personal communication and security apparatus, also referred to hereinafter as a combination emergency phone and pager, or phone/pager 10. The internal components of the phone/pager 10 are contained within a lightweight and rigid housing 12. The housing 12 is constructed of a durable material that will withstand being continuously carried in an individual's pocket or purse.

Figure 1:
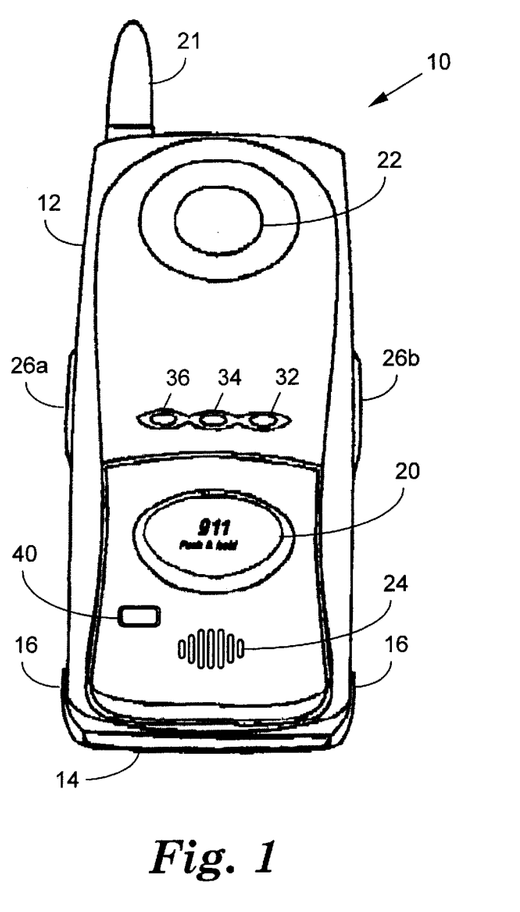
FIG. 1 is a front view of an emergency phone with a flip top cover in an open position.
Figure 2:
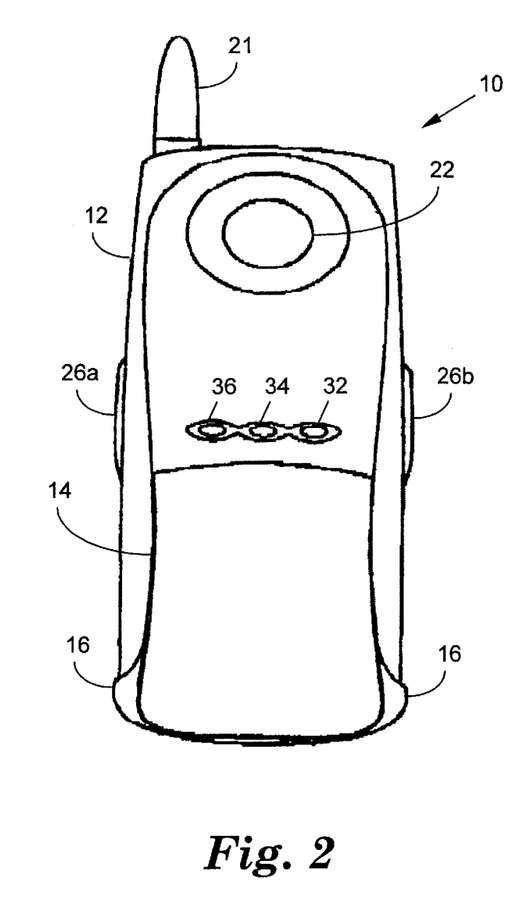
FIG. 2 is a front view of the emergency phone with the flip top cover in a closed position.
Figure 3:
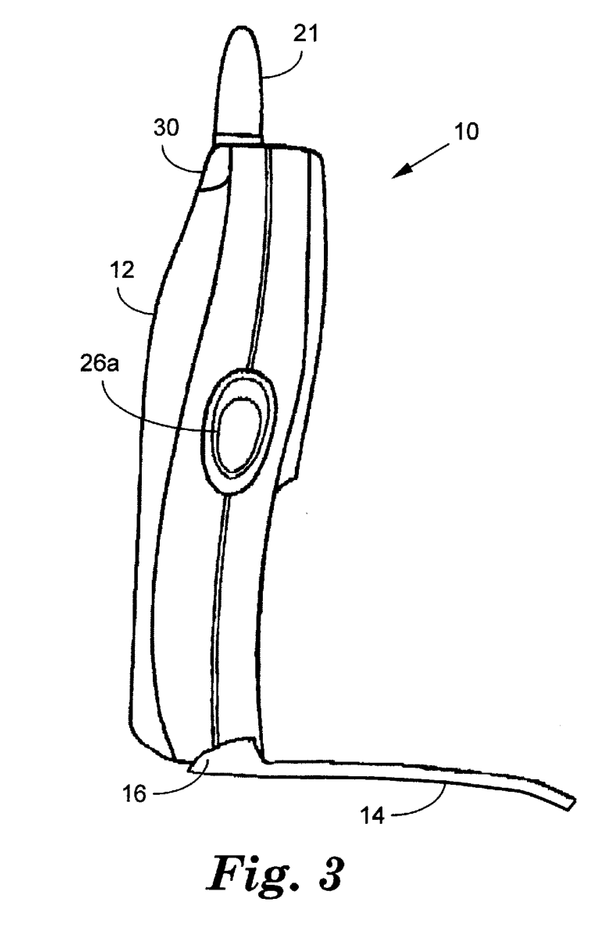
FIG. 3 is a side view of the emergency phone with the flip top cover in an open position.

Preferably, a flip top cover 14 is connected to the housing 12 with a pair of hinges 16. The flip top cover 14 folds over the lower half of the front of the rigid housing 12. The flip top cover 14 is spring-loaded in the closed position where it is held in place by a latch. When the latch is released, the cover 14 springs open to reveal the lower half of the front of the housing 12. FIGS. 1 and 3 show the cover 14 in the open position, and FIG. 2 shows the cover 14 in the closed position.

When in the closed position, the flip top cover 14 covers a single large emergency response button 20. Thus, the flip top cover 14 helps prevent the emergency response button 20 from being accidentally pressed. When pressed, the single large button 20 activates the cellular phone component of the phone/pager 10. To summon help in an emergency situation, a user simply opens the flip top cover 14 and presses the emergency response button 20. As soon as the button 20 is pressed, the phone/pager 10 begins searching for a cellular telephone service provider.

Once a communication channel is assigned to the phone/pager 10 by a cellular telephone service provider, the phone/pager 10 automatically contacts a private emergency response service. Preferably, this private service, to which the caller has previously subscribed, maintains a list of persons to contact when the caller presses the emergency response button 20. When cellular communications have been established between the private service and the phone/pager 10, the phone/pager 10 transmits information to the private service indicating the identity and location of the caller. The private service then forwards this information to the persons on the contact list, and informs the persons on the list that the caller is involved in an emergency situation in a particular location.

In a preferred embodiment of the invention, the phone/pager 10 contacts the private emergency response service by sending a paging message to a central paging service. The paging message contains (1) an identification number that has been assigned to the phone/pager 10 from which the emergency call was made, (2) the time that the emergency call was made, (3) the telephone area code from which the emergency call was made, and, in one embodiment of the invention, (4) longitude/latitude coordinates of the location of the phone/pager 10. Preferably, the phone/pager 10 repeatedly transmits this paging message every five minutes from the time that the emergency response button 20 is pressed. The paging service forwards the paging message to the private emergency response service.

After the phone/pager 10 has transmitted the identity/location information to the private emergency response service, the phone/pager 10 automatically calls a public emergency response service, such as the familiar 911 service.

With continued reference to FIG. 1, a radio frequency antenna 21, mounted on the housing 12, is used to transmit and receive the cellular communications. The antenna 21 is preferably low in profile, such as shown in FIG. 1, so that the phone/pager 10 is compact and easily stored in a pocket or purse without the possibility of damaging the antenna 21.

A microphone 24 and an audio output device, such as a speaker 22, located on the housing 12 enable the operator of the phone/pager 10 to establish full duplex voice communications with personnel at the public emergency response service. In an alternate embodiment, the audio output device includes a tethered ear piece that is placed in the ear of the operator.

In order to minimize the cost of the cellular service needed to support it, the cellular phone component of the phone/pager 10 is strictly limited to emergency use only. Because a cellular service provider can be sure that the cellular phone component of the phone/pager 10 will only be used in emergency situations, the service provider will typically be willing to provide the cellular service at a reduced rate. Furthermore, as previously discussed, governmental regulations prohibit cellular service providers from refusing calls to 911 emergency response services even if the caller does not subscribe to a cellular service.

Another one of the primary benefits of limiting use of the phone/pager 10 to contacting emergency response services is the resulting simplicity of operation. The emergency response button 20 is relatively large; preferably about 1.5 inches in diameter. Even very young children and elderly consumers can be taught how to summon emergency personnel using the emergency response button 20 of the phone/pager 10. Additionally, the time required to summon the emergency personnel is held to an absolute minimum. Almost as soon as the button 20 is pressed, the emergency response service personnel have a verbal communications link to the scene of the emergency. Furthermore, as discussed in more detail below, the phone/pager 10 may include a locator function which uses global positioning systems (GPS) and cellular location systems to provide the location of the phone/pager 10 to the emergency response service.

In addition to establishing cellular contact with emergency response services, the phone/pager 10 can activate a user's home security system when an emergency situation arises near the home. As explained in greater detail below, this home security alarm function is activated when the user presses a home security alarm button 40 as shown in FIG. 1. Because the communication range of the phone/pager 10 is limited, the phone/pager 10 can only contact the user's home security system when the phone/pager 10 is close to the home security system. Preferably, the communications range of the phone/pager 10 extends to at least 500 feet from the home security system.

The home security system can react to the phone/pager's signal in a number of ways. In the preferred embodiment, the home security system turns the lights of the residence on and off and activates any audible alarms that the home security system uses. Turning the house's lights on and off and sounding the home security system's audible alarms can be beneficial for a number of reasons. First, the home security system alarm will only be activated if the phone/pager 10 is used near the home. Thus, if the emergency situation involves an intruder or attacker, turning on the lights and sounding the alarms may scare the individual away. Secondly, turning on the lights and sounding the alarms will alert any individuals in or around the house that an emergency situation exist in or near the house. In addition, any of the variety of other functions typically performed by a home security system can be triggered by the signal from the phone/pager 10.

In one embodiment, the phone/pager 10 includes the ability to communicate with a user's car alarm. In a manner similar to that described for contacting the user's home security system, the phone/pager 10 transmits a signal that activates the car alarm. The phone/pager 10 will only be able to signal the car alarm if the user is near the car when the phone/pager 10 is activated. Thus, the car alarm will help draw attention to the area in which the emergency situation exists. This could be especially beneficial if the emergency situation arose in a parking lot. Furthermore, if the car was just stolen, setting off the car alarm will draw attention to the thief and the stolen car.

The preferred embodiment of the invention includes an audible alarm, such as a siren, that alerts individuals in the immediate area to the emergency situation. The audible alarm is activated by simultaneously pressing two audible alarm buttons 26a and 26b on the sides of the phone/pager 10 as shown in FIG. 1. As discussed in more detail hereinafter, when the buttons 26a–b are pressed, the audible alarm begins emitting a siren-type noise from holes 47 in the back of the housing 12.

Figure 4:
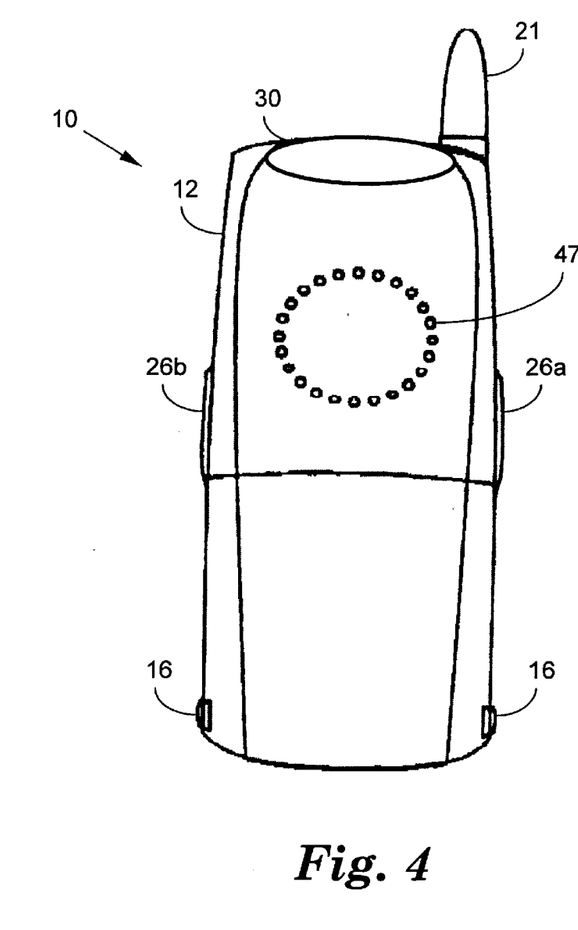
FIG. 4 is a rear view of the emergency phone.

Preferably, the phone/pager 10 also includes a flashing light 30 mounted in the housing 12, as shown in FIG. 4. As with the audible alarm, the flashing light 30 is also activated when the buttons 26a and 26b are pressed simultaneously. Both the flashing light 30 and the noise alarm serve the same functions. On the one hand they serve to scare off attackers, and on the other hand they serve to draw attention to the individual requesting emergency assistance. Since the phone/pager 10 can be activated from anywhere that cellular service is available, the exact location of the caller may be unknown to the emergency response personnel. By drawing attention to the phone/pager 10 and its operator, the flashing light 30 and the audible alarm aid emergency response personnel in locating the operator.

With continued reference to FIG. 1, a set of indicator lights 32, 34 and 36 are preferably located on the front of the housing 12. These lights 32, 34, and 36 provide the user of the phone/pager 10 information concerning whether the phone/pager 10 is within communications range of a cellular network, whether the phone/pager 10 has been activated, and whether the power supply of the phone/pager 10, such as a battery, is running low. Preferably, the cellular range indicator light 32 is green when a channel is assigned to the phone/pager 10 by a cellular service provider, and is red when no service is available. The activation light 36 is off when the phone/pager 10 has not been activated and turns red when the phone 10 is activated. The power supply light 34 is off when the power supply is functioning properly and turns yellow to indicate a low power condition.

As described above, a preferred embodiment of the present invention includes a locator function. The locator function provides the location of the phone/pager 10 to the emergency response service at the time that the locator function is activated. The locator function may be implemented in a variety of different embodiments. For example, one embodiment involves the use of a GPS receiver. A GPS receiver utilizes signals from satellites orbiting the earth to determine the position of the receiver. When the emergency response button 20 is pressed, the GPS receiver determines the location of the phone/pager 10. The phone/pager 10 then automatically transmits this positional information to the emergency response services. Another embodiment of the present invention uses a cellular location system to determine the position of the phone/pager 10 by triangulation. This cellular location system uses the strength of the signal from a cellular device at different cellular stations to determine the location of the cellular device. Positional information is extremely beneficial in an emergency situation because it allows the emergency response service to determine the location of the caller without requiring any input from the caller.

Figure 5:
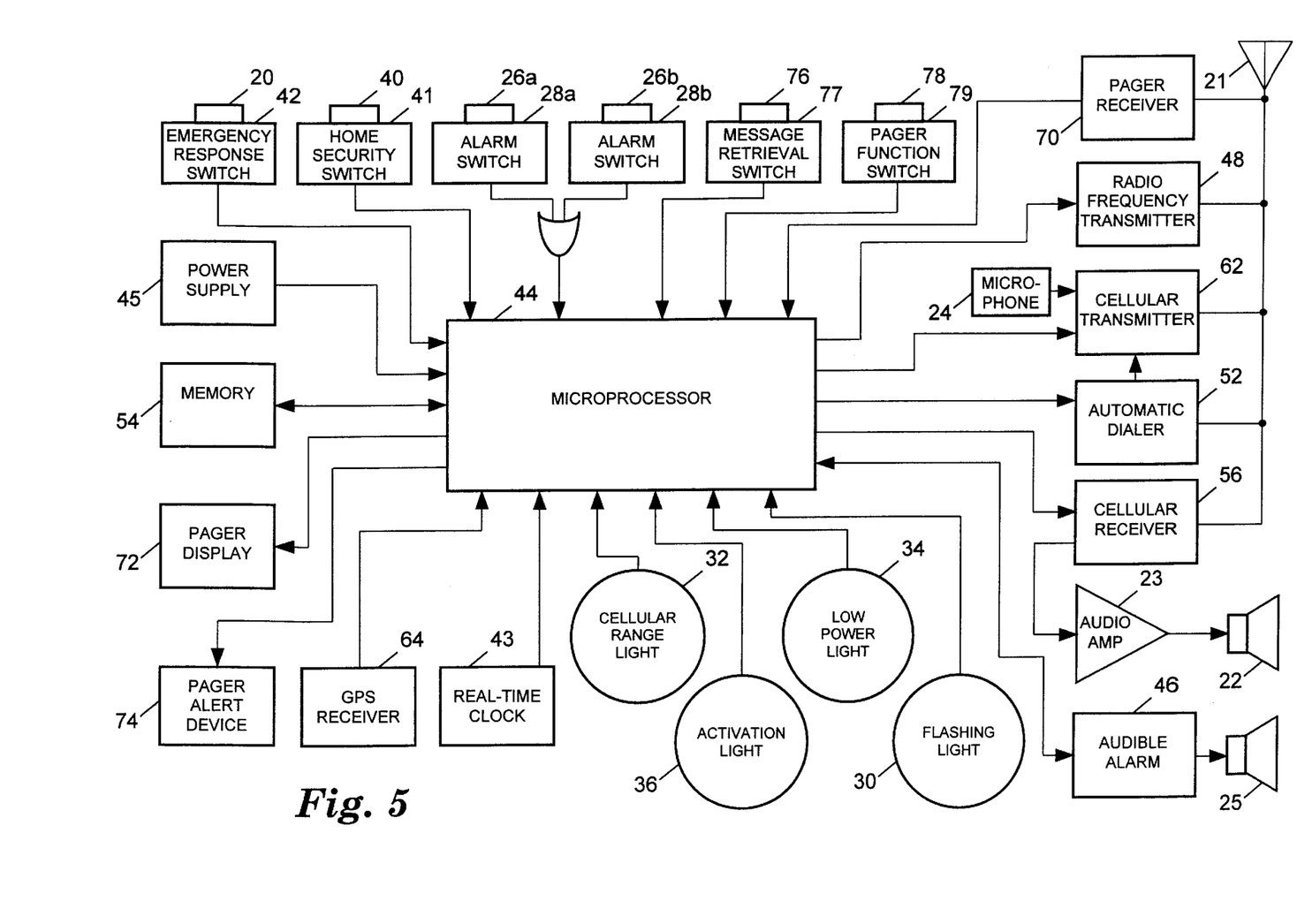
FIG. 5 is a functional block diagram of a preferred embodiment of the emergency phone.

Referring now to FIG. 5, a block diagram of the electrical components of a preferred embodiment of the phone/pager 10 is shown. The electrical components of the phone/pager 10 are controlled by a microprocessor 44. Power for the electrical components of the phone/pager 10 is supplied by a power supply 45. Preferably, the power supply 45 is a DC power supply and includes replaceable batteries such as AA or AAA alkaline batteries. These types of batteries are preferred because they will allow a minimum talk time of at least 30 minutes, are relatively inexpensive, and are easily replaceable.

With continued reference to FIG. 5, an emergency response switch 42 changes state when the user presses the emergency response button 20. When the microprocessor 44 detects a change of state of the emergency response switch 42, the microprocessor 44 activates an automatic dialer 52. Preferably, the automatic dialer 52 then sends the telephone number of the paging service to a cellular transmitter 62. The cellular transmitter 62 generates a cellular signal including the phone number of the paging service which is broadcast from the antenna 21 to the cellular provider network. The telephone number is preferably stored in the automatic dialer 52 itself. However, in an alternate embodiment, the telephone number is stored in the memory 54.

When cellular communications have been established with the paging service, the microprocessor 44 retrieves the phone/pager's identification number from the memory 54.

The microprocessor 44 also retrieves the current time from a real-time clock 43. In the embodiment of the invention that includes the GPS receiver 64, the microprocessor 44 retrieves the location information from the GPS receiver 64. The microprocessor 44 then sends the phone/pager's identification number, the current time, the location information, and, preferably, the telephone area code to the cellular transmitter 62. The cellular transmitter 62 receives this information and transmits it to the paging service. As described above, the paging service receives this information and retransmits it, in the form of a paging message, to the private emergency response service.

In an alternative embodiment, the automatic dialer 52, when activated, sends the telephone number of the private emergency response service to a cellular transmitter 62. The cellular transmitter 62 then generates a cellular signal including the phone number of the private emergency response service, and the cellular signal is broadcast from the antenna 21 to the cellular provider network. With this embodiment, the cellular transmitter 62 transmits the identification number, the current time, and the location information directly to private emergency response service.

After the identification/time/location information has been transmitted to the private emergency response service, the automatic dialer 52 sends the telephone number of nearest public emergency response service (such as 911) to the cellular transmitter 62. The cellular transmitter 62 then generates a cellular signal, including the phone number of the public emergency response service, which is broadcast from the antenna 21 to the cellular provider network. Once the public emergency response service has received the call from the cellular network, full-duplex communications are established between the phone/pager 10 and the public emergency response service.

A cellular receiver 56 receives cellular signals from the public emergency response service and generates audio signals based on the received cellular signals. The cellular receiver 56 provides the audio signals to an input of the audio amplifier 23 where they are amplified and sent to the speaker 22.

With continued reference to FIG. 5, the user communicates with the public emergency response service by speaking into a microphone 24. The microphone 24 converts the operator's speech into electric signals that are received by the microprocessor 44. The microprocessor 44 then sends the signals to a cellular transmitter 62 which conditions the signals and broadcast them on the antenna 21. In an alternate embodiment, the signals are sent directly from the microphone 24 to the cellular transmitter 62.

The phone/pager 10 is designed to use the cellular communications technology that provides the most comprehensive coverage possible. Using the cellular technology that provides the largest possible coverage area is desirable because it minimizes the likelihood that the operator of the phone/pager 10 will be out of cellular communications range when an emergency situations arises. While the coverage range of digital cellular service providers is constantly increasing, the largest amount of cellular coverage is still provided by service providers using analog modulation technology. Thus, in the preferred embodiment, the cellular receiver 56 and cellular transmitter 62 use analog modulation technology. Furthermore, because the amount of time actually spent communicating with the phone/pager 10 will likely be very low, the cellular receiver 56 and transmitter 62 components are designed for maximum range and minimal talk times.

In another alternative embodiment, the phone/pager 10 is designed to scan for a digital cellular provider. If a digital cellular service provider is located, the phone/pager 10 will establish digital communications with the digital service provider. If no digital service provider is located, the phone/pager 10 then attempts to establish analog cellular communications with an analog service provider.

Figure 6:
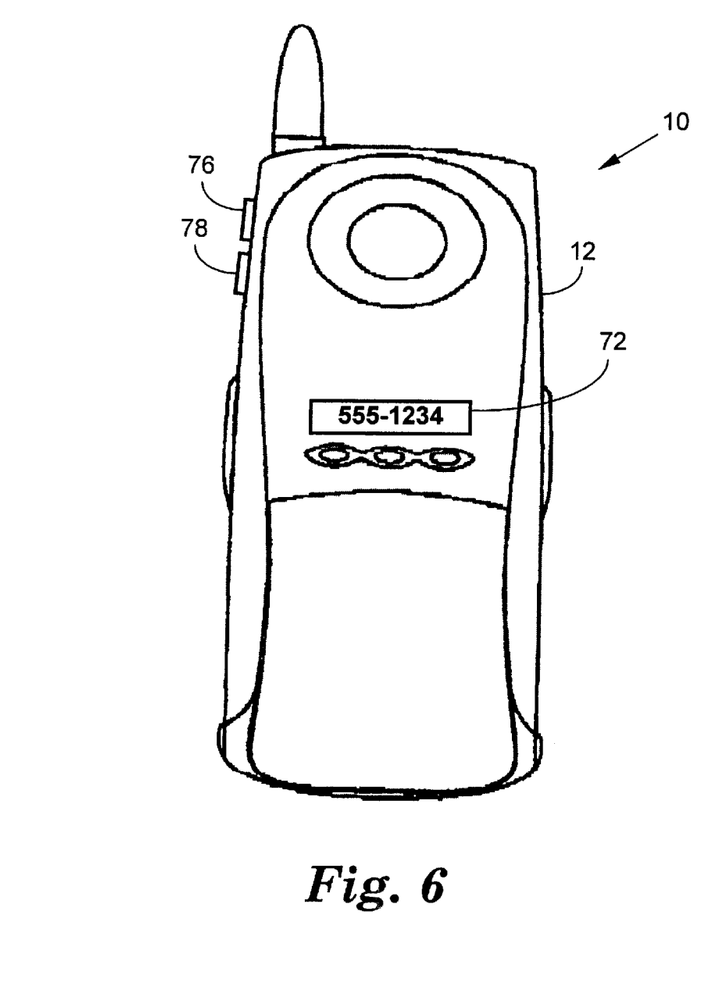
FIG. 6 is a front view of an alternative embodiment of the emergency phone with the flip top cover in the closed position.
Figure 7:
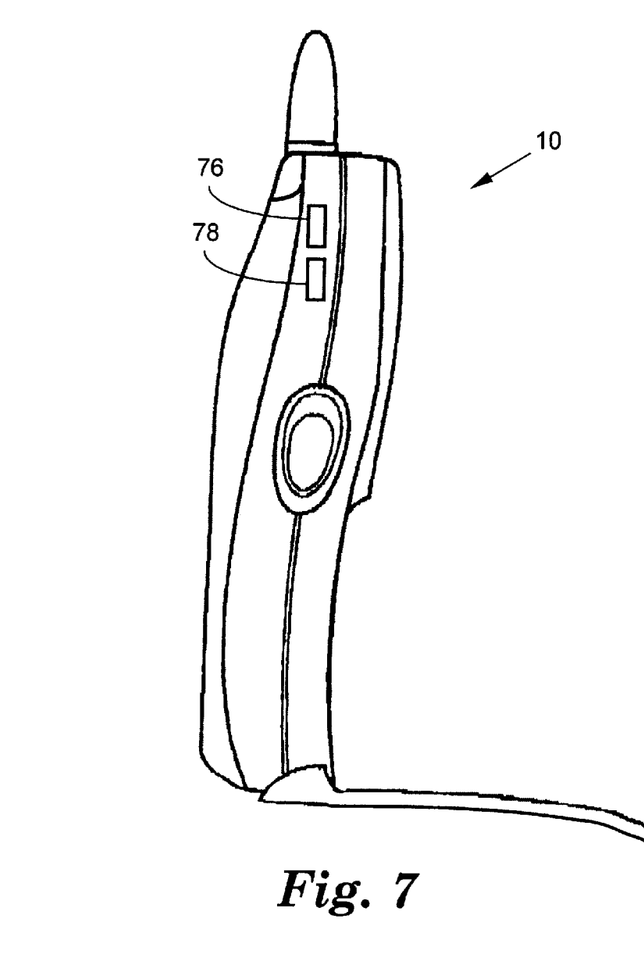
FIG. 7 is a side view of an alternative embodiment of the emergency phone with the flip top cover in the open position.

In another embodiment of the invention, the phone/pager 10 includes a pager receiver 70 for receiving paging messages from a central paging service. As shown in FIG. 6, this embodiment includes a liquid crystal display (LCD) 72 on the front of the housing 12. Also, as shown in FIGS. 6 and 7, this embodiment includes a message retrieval button 76 and a pager function control button 78. These buttons 76 and 78 activate various functions of the phone/pager 10, as discussed further below.

When a radio paging signal is sent to the phone/pager 10 from a central paging service, the antenna 21 receives the signal and provides it to the front end of the pager receiver 70. The pager receiver 70 receives the paging signal from the antenna 21 and converts the information contained in the signal into an identification message and a paging message. The identification message contains a message identifier, such as a number, that identifies which particular pager the paging message is intended. The pager receiver 70 sends the identification message to pager control means, such as the microprocessor 44.

Upon receipt of the identification message, the microprocessor 44 compares the message identifier to a pager identifier that is stored in a memory 54, such as an electrically-erasable programmable read-only (EEPROM) device. If the message identifier matches the pager identifier, then the paging message is intended for the user of that particular phone/pager 10. When the identifiers match, the microprocessor 44 activates a pager alert device 74, such as an audible tone generator or mechanical vibrator. Thus, when the paging message is intended for the user of the phone/pager 10, the pager alert device 74 notifies the user of the receipt of the paging message.

If the message identifier and pager identifier match, the microprocessor 44 stores the paging message in the memory 54. In the preferred embodiment, the paging message, such as a phone number, is stored in a stack within the memory 54. In a preferred embodiment, the microprocessor 44 also sends the paging message to the pager LCD display 72 where the message is displayed in an alphanumeric format so that the user may then read the paging message.

Preferably, paging messages are stored in the stack of the memory 54, along with a time and date stamp, in the order in which they are received. If the user did not have an opportunity to respond to the paging message at the time that it was received, the user may review the messages that are stored in the memory 54. To retrieve a message from memory 54, the user simply presses the message retrieval button 76 which changes the state of a message retrieval switch 77. When the microprocessor 44 detects that the message retrieval switch 77 has changed state, the microprocessor 44 retrieves the first message in the stack (the oldest message), and sends it to the display 72 along with its date and time stamp. If the user presses the message retrieval button 76 again within a certain time period, the microprocessor 44 retrieves the next message from the stack and sends it to the display 72. By continuing to repeatedly press the message retrieval button 76, the user can scroll through all of the messages stored in the stack.

If the user wants to delete a message from the stack, the user presses the pager function control button 78 while the message is displayed on the display 78. When the user presses the function control button 78, the state of a pager function control switch 79 is changed. When the microprocessor 44 detects that the pager function control switch 79 has changed state, the microprocessor 44 generates a prompt signal that is sent to the display 78. The prompt signal generates an alphanumeric message on the display such as: "Save or delete message?"To save the message, the user presses the message retrieval button 76; to delete the message, the user presses the function control button 78. In this situation, since the user wishes to delete the message from the memory 54, the user presses the function control button 78. When the user presses the function control button 78, the function control switch 79 changes state. In this situation, when the microprocessor detects a change of state of the function control switch 79, the microprocessor 44 deletes the message from the stack, and the most recent messages all move up one position in the stack.

If the user presses the message retrieval button 76 to save a message when prompted as above, the microprocessor 44 retains the message in the stack, and redisplays the message on the display 72. The user can then press the message retrieval button 76 again to scroll to the next message in the stack as described above.

In the preferred embodiment, after a certain time has elapsed during which neither the message retrieval button 76 nor the function control button 78 has been pressed, the microprocessor 44 enters a standby mode. During the standby mode, the display 72 is blank. If the user presses the function control button 78 while the processor 44 is in the standby mode, the microprocessor 44 generates a prompt signal that is sent to the display 78. The prompt signal generates an alphanumeric message on the display such as: "Audio or vibrating page alert?"To put the phone/pager 10 in an audio alert mode so that the pager alert device generates an audible alert signal when a paging signal is received, the user would press the message retrieval button 76. To put the phone/pager 10 in an vibrating alert mode so that the pager alert device generates a vibrating alert signal when a paging signal is received, the user would press the function control button 78. After the user makes a selection, the pager alert device 74 enters the selected alert mode and the microprocessor 44 returns again to the standby mode.

With continued reference to FIG. 5, the microprocessor 44 monitors the state of a pair of alarm switches 28a and 28b that change state when the user presses the alarm buttons 26a and 26b.

When the microprocessor 44 detects that both of the alarm switches 28a–b have changed state, the microprocessor 44 activates the audible alarm 46. As mentioned above, when activated, the audible alarm 46 generates a siren-like audio alarm signal. The speaker 25 converts the audio alarm signal into sound.

However, in a preferred embodiment, if duplex cellular communications have been established with the emergency response service, the microprocessor 44 turns off the audio alarm 46. This feature prevents the microphone 24 from picking up the audible alarm signal from the speaker 25 and interfering with the user's communication with the emergency response service.

In the preferred embodiment, the microprocessor 44 monitors the state of home security alarm switch 41 which changes state when the user presses the home security alarm button 40. When the microprocessor 44 detects that the home security alarm switch 41 has changed state, the microprocessor 44 activates the radio frequency transmitter 48. Upon activation, the radio frequency transmitter 48 then generates a home security alarm activation signal which is broadcast on the antenna 21. The preferred radio frequency transmitter 48 operates at 310 MHZ. The home security system receives the home security alarm activation signal and responds accordingly. As discussed above, the response preferably at least includes turning on and off the exterior lights of the house and producing an audible alarm.

Figure 8:
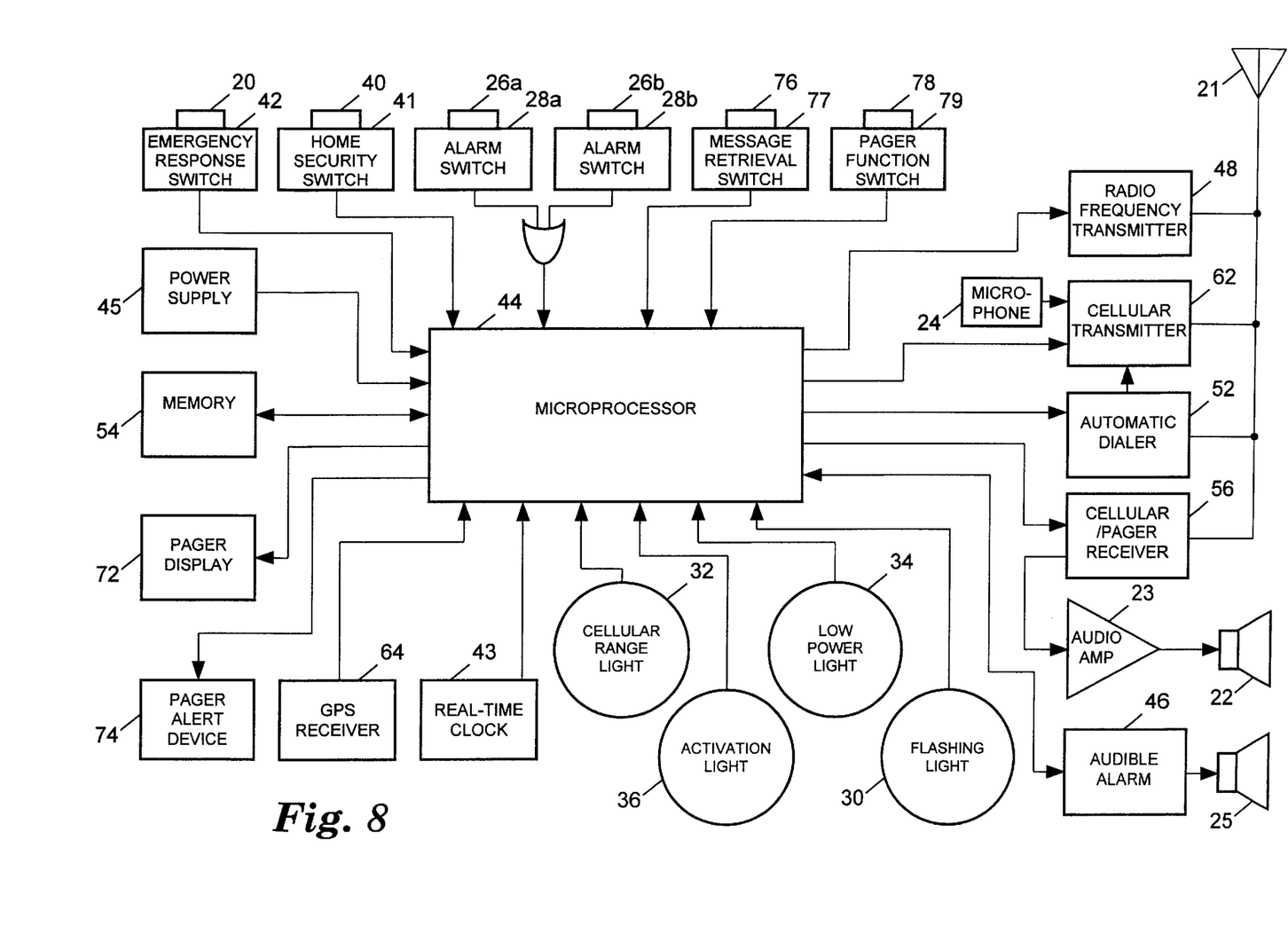
FIG. 8 is a functional block diagram of an alternative embodiment of the emergency phone.

In an embodiment as shown in FIG. 8, the functions of the pager receiver and the functions of the cellular receiver as described above are combined in a single cellular/pager receiver 57. This embodiment further reduces weight, size, and power consumption by using common radio-frequency and digital components for the paging and cellular phone features.

With reference now to FIG. 5, the microprocessor 44 prompts a GPS receiver 64 to determine the location of the phone/pager 10 when the emergency response button 20 is pressed. Once the GPS receiver 64 has determined the coordinates of the phone/pager 10, the GPS receiver 64 provides the coordinates to the microprocessor 44. The microprocessor 44 then sends the coordinates to the cellular transmitter 62. The cellular transmitter 62 sends the location coordinates to the public emergency response service by way of a cellular telephone network. The location coordinates allow the public emergency response service to dispatch emergency personnel to the location from which the call was placed, even if the caller does not know or cannot communicate the location. As discussed above, these location coordinates are also sent to the private emergency response service.

The microprocessor 44 also controls the set of indicator lights 32, 34 and 36. As previously discussed, the indicator lights 32, 34 and 36 provide the operator of the phone/pager 10 status information concerning the functioning of the phone/pager 10. These lights 32, 34 and 36 preferably include a cellular range indicator light 32, a low power light 34, and an activation light 36. However, it is understood that a variety of different indicator lights 32, 34 and 36 could be provided without departing from the spirit of the invention.

While the invention has been described in detail, it will be apparent to persons skilled in the relevant art that the invention may be modified without departing from the spirit of the invention. Various changes in form, design or arrangement may be made to the invention without departing from the spirit and scope of the invention. Therefore, the above description is to be considered exemplary, rather than limiting, and the true scope of the invention is defined in the following claims.

What is claimed is:

1. A hand-held wireless communication apparatus for transmitting and receiving cellular radio signals that are compatible with a cellular network, and for summoning assistance in an emergency situation, the apparatus comprising:

a lightweight and rigid housing;

a cellular transmitter disposed within the housing that, when activated, generates first outgoing cellular radio signals that contain identification information for indicating to a private emergency response service an identity associated with the apparatus, and immediately after completion of communication with the private emergency response service, automatically generates second outgoing cellular radio signals to establish full-duplex communication with a public emergency response service;

one large emergency response button disposed in the housing, the emergency response button being the sole means of activating the transmitter, which, when pressed once, alone activates the transmitter to cause the transmitter to generate the first and second outgoing cellular radio signals, there being no control buttons for activating the transmitter other than the one emergency response button;

receiver means disposed within the housing for receiving incoming cellular radio signals over the cellular network from at least one of the emergency response services, and for converting the incoming cellular radio signals into audio signals;

an audio output device electrically connected to the receiver means for receiving the audio signals from the receiver means and for generating audible messages based on the audio signals; and an electrical power source disposed within the housing for supplying electrical power to the apparatus.

2. The hand-held wireless communication apparatus of claim 1 wherein the transmitter generates the first outgoing cellular radio signals to include a nonverbal paging signal containing information for identifying and indicating the location of the apparatus.

3. The hand-held wireless communication apparatus of claim 2 wherein the transmitter transmits the first outgoing cellular radio signals, including the nonverbal paging signal, directly to the private emergency response service.

4. The hand-held wireless communication apparatus of claim 2 wherein the transmitter transmits the first outgoing cellular radio signals, including the nonverbal paging signal, to a central paging service that forwards the information for identifying and indicating the location of the apparatus to the private emergency response service.

5. The hand-held wireless communication apparatus of claim 1 further comprising an audible alarm for audibly alerting individuals in the area surrounding the apparatus that an emergency situation exists, the audible alarm activated by at least one alarm button on the housing.

6. The hand-held wireless communication apparatus of claim 1 further comprising a visual alarm for visually alerting individuals in the area surrounding the apparatus that an emergency situation exists, the visual alarm activated by at least one alarm button on the housing.

7. The hand-held wireless communication apparatus of claim 1 further comprising a location determining device for determining the location of the apparatus.

8. The hand-held wireless communication apparatus of claim 7 wherein the location determining device uses a global positioning system to determine the location of the apparatus when the single emergency response button is pressed.

9. The hand-held wireless communication apparatus of claim 1 further comprising a radio frequency transmitter for establishing radio communications with a home security system of a user of the apparatus if the apparatus is within radio communication range of the home security system when an emergency situation arises.

10. The hand-held wireless communication apparatus of claim 1 further comprising a radio frequency transmitter for activating a car alarm system of a user of the apparatus if the apparatus is within radio communications range of the car alarm system when an emergency situation arises.

11. The hand-held wireless communication apparatus of claim 1 further comprising a flip top cover mounted on the housing that covers the emergency response button and reduces the possibility of accidentally activating the cellular transmitter.

12. The hand-held wireless communication apparatus of claim 1 wherein the cellular transmitter and the receiver means use analog modulation communications.

13. The hand-held wireless communication apparatus of claim 1 wherein the cellular transmitter and the receiver means use digital modulation communications when a digital cellular service provider is within communications range and analog modulation when a digital cellular service provider is not within communications range.

14. The hand-held wireless communication apparatus of claim 1 further comprising indicator lights for indicating when the apparatus is within communications range of a cellular network, when the apparatus has been activated, and when the electrical power source is not supplying adequate electrical power to the apparatus.

15. The hand-held wireless communication apparatus of claim 1 wherein the receiver means further comprise a pager receiver for receiving radio paging signals from a central paging service and for generating paging messages based upon the radio paging signals.

16. The hand-held wireless communication apparatus of claim 1 further comprising a pager for receiving radio paging signals from a central paging service and for generating paging messages based upon the radio paging signals.

17. The hand-held wireless communication apparatus of claim 16 wherein the pager further comprises:

a pager receiver for receiving the radio paging signals from the central paging service and for generating the paging messages based upon the radio paging signals;

a pager alert device for generating alert signals when the pager receiver receives the radio paging signals;

a pager memory for storing and providing access to the paging messages;

a pager display device for generating a visual display of alphanumeric characters based upon the paging messages; and pager control means connected to the pager memory and the pager display device for retrieving paging messages from the pager memory and for sending the paging messages to the pager display device, the pager control means having user control buttons that, when pressed, cause the pager control means to designate particular paging messages to be saved in or erased from the pager memory, and that cause the pager control means to send particular paging messages to the pager display device.

18. A hand-held wireless communication apparatus for transmitting and receiving cellular radio signals that are compatible with a cellular network, and for summoning assistance in an emergency situation, the apparatus comprising:

a lightweight and rigid housing;

a cellular transmitter disposed within the housing that, when activated, transmits first outgoing cellular radio signals to a central paging service, the first outgoing cellular radio signals including a paging signal containing information for identifying the apparatus and indicating the location of the apparatus, where the central paging service forwards the information to the private emergency response service, and immediately after completion of the transmission to the central paging service, automatically transmits second outgoing cellular radio signals to establish full-duplex communication with a public emergency response service;

one large emergency response button disposed in the housing, the emergency response button being the sole means of activating the transmitter, which, when pressed once, alone activates the transmitter to cause the transmitter to generate the first and second outgoing cellular radio signals, there being no control buttons for activating the cellular transmitter other than the one emergency response button;

receiver means disposed within the housing for receiving incoming cellular radio signals over the cellular network from at least one of the emergency response services, and for converting the incoming cellular radio signals into audio signals;

an audio output device electrically connected to the receiver means for receiving the audio signals from the receiver means and for generating audible messages based on the audio signals;

an audible alarm for audibly alerting individuals in an area surrounding the apparatus that an emergency situation exists, the audible alarm activated by at least one alarm button on the housing;

a visual alarm for visually alerting individuals in an area surrounding the apparatus that an emergency situation exists, the visual alarm activated by the at least one alarm button on the housing;

a flip top cover mounted on the housing that covers the emergency response button and reduces the possibility of accidentally activating the cellular transmitter;

an electrical power source disposed within the housing for supplying electrical power to the apparatus; and indicator lights for indicating when the apparatus is within communications range of a cellular network, when the apparatus has been activated, and when the electrical power source is not supplying adequate electrical power to the apparatus.

19. A security system for summoning assistance in an emergency situation, the security system comprising;

a home security system for producing alarms in response to a variety of emergency situations, the home security system capable of activation by wireless communications; and a hand-held personal security device comprising:

a radio frequency transmitter for establishing wireless communications with the home security system if the hand-held personal security device is within communications range of the home security system when the radio frequency transmitter is activated;

a home security alarm button that activates the radio frequency transmitter and causes the hand-held personal security device to establish radio communications with the home security alarm system;

a cellular transmitter that, when activated, transmits first outgoing cellular radio signals that contain information for a private emergency response service, and immediately after completion of the transmission to the private emergency response service, automatically transmits second outgoing cellular radio signals to establish full-duplex communication with a public emergency response service;

an one large emergency response button which is the sole means of activating the transmitter, that, when pressed once, alone activates the cellular transmitter to cause the cellular transmitter to generate the first and second outgoing cellular radio signals, there being no control buttons for activating the cellular transmitter other than the one emergency response button;

receiver means for receiving incoming cellular radio signals over the cellular network from at least one of the emergency response services, and for converting the incoming cellular radio signals into audio signals;

an audio output device electrically connected to the receiver means for receiving the audio signals from the receiver means and for generating audible messages based on the audio signals; and an electrical power source for supplying electrical power to the device.

20. The security system of claim 19 wherein the radio frequency transmitter is further operable to activate a car alarm system when the hand-held personal security device is within radio communications range of the car alarm system.

21. The security system of claim 19 wherein the hand-held personal security device is contained in a rigid housing with a flip top cover that covers at least the emergency response button and the home security alarm button, and that minimizes the likelihood that the buttons will be inadvertently pressed.

22. The security system of claim 19 wherein the hand-held personal security device further comprises a visual alarm for visually alerting individuals in an area surrounding the hand-held personal security device that an emergency situation exists, the visual alarm activated by at least one alarm button on the housing.

23. The security system of claim 19 wherein the hand-held personal security device further comprises locator means for determining the location of the hand-held personal security device.

* * * * *